United States Patent [19]
Kozlowski et al.

[11] Patent Number: 5,892,540
[45] Date of Patent: Apr. 6, 1999

[54] LOW NOISE AMPLIFIER FOR PASSIVE PIXEL CMOS IMAGER

[75] Inventors: Lester J. Kozlowski, Simi Valley; William A. Kleinhans, Westlake Village, both of Calif.

[73] Assignee: Rockwell International Corporation, Costa Mesa, Calif.

[21] Appl. No.: 662,382

[22] Filed: Jun. 13, 1996

[51] Int. Cl.[6] .......................... H04N 5/217; H04N 5/335
[52] U.S. Cl. .......................... 348/300; 348/241; 348/308; 348/310; 250/208.1
[58] Field of Search .......................... 330/86, 282, 308; 348/207, 222, 241, 243, 244, 245, 250, 294, 302, 303, 307, 308, 309, 310, 300, 301; 250/208.1; H04N 5/335, 5/217

[56] References Cited

U.S. PATENT DOCUMENTS

| | | | |
|---|---|---|---|
| 4,387,402 | 6/1983 | Lewis | 358/213 |
| 4,786,831 | 11/1988 | Morse et al. | 307/490 |
| 5,043,820 | 8/1991 | Wyles et al. | 358/213.28 |
| 5,153,421 | 10/1992 | Tandon et al. | 250/208.1 |
| 5,296,696 | 3/1994 | Uno | 250/208.1 |
| 5,345,266 | 9/1994 | Denyer | 348/300 |
| 5,349,380 | 9/1994 | Stein | 348/250 |
| 5,461,425 | 10/1995 | Fowler et al. | 348/294 |
| 5,619,262 | 4/1997 | Uno | 348/297 |
| 5,734,191 | 3/1998 | Chi et al. | 257/462 |
| 5,751,189 | 5/1998 | Shyu et al. | 330/9 |

OTHER PUBLICATIONS

Degrauwe et al., "A Micropower CMOS–Instrumentation Amplifier," *IEEE Journal of Solid–State Circuits*, vol. SC–20, No. 3, pp. 805–807, Jun. 1985.

*Primary Examiner*—Wendy Garber
*Assistant Examiner*—Ngoc-Yen Vu
*Attorney, Agent, or Firm*—James P. O'Shaughnessey; John J. Deinken

[57] ABSTRACT

A CMOS imaging system provides low noise read out and amplification for an array of passive pixels, each of which comprises a photodetector, an access MOSFET, and a second MOSFET that functions as a signal overflow shunt and a means for electrically injecting a test signal. The read out circuit for each column of pixels includes a high gain, wide bandwidth, CMOS differential amplifier, a reset switch and selectable feedback capacitors, selectable load capacitors, correlated double sampling and sample-and-hold circuits, an optional pipelining circuit, and an offset cancellation circuit connected to an output bus to suppress the input offset nonuniformity of the amplifier. For full process compatibility with standard silicided submicron CMOS and to maximize yield and minimize die cost, each photodiode may comprise the lightly doped source of its access MOSFET. Circuit complexity is restricted to the column buffers, which exploit signal processing capability inherent in CMOS. Advantages include high fabrication yield, broadband spectral response from near-UV to near-IR, low read noise at HDTV data rates, large charge-handling capacity, variable sensitivity with simple controls, and reduced power consumption.

20 Claims, 2 Drawing Sheets

LOW NOISE AMPLIFIER FOR PASSIVE PIXEL CMOS IMAGER

TECHNICAL FIELD

The present invention relates to electronic imaging devices and, in particular, to a low noise amplifier system having charge integrating column buffers for a passive pixel CMOS imager.

BACKGROUND OF THE INVENTION

Most currently available video cameras use charge coupled devices (CCDs) for generating video images. Although these cameras are suitable for many applications, the relatively high cost of CCD-based camera technology limits its use in high volume commercial markets, such as personal computer teleconferencing, for example.

The higher cost of CCD camera systems results from a combination of factors, such as many mask levels for CCD processes; lower yields for the photosensor due to high complexity; shared pixel real estate for the photosensor and CCD shift register, which requires micro-optics or alternative die-area doubling frame transfer schemes (or otherwise limits the optical fill factor); front-illuminated designs that may require photodetection through overlying polysilicon layers, which generally degrade response in the blue and near-UV regions of the spectrum; complex interface and signal processing electronics that may not be compatible with battery operation; support electronics functions that are not readily integrated onto the CCD imager; and interface electronics that require high voltage clock drivers and DC biases to operate the CCD and the video signal conditioning amplifier (including correlated double samplers and other circuitry needed to manipulate the video into the proper protocol).

Various MOSFET-based alternatives to CCD sensors are also known in the prior art for lower cost applications. Hitachi, for example, has produced a MOS-based photodiode imaging array for high-volume applications, including camcorders (Hitachi Part No. HE98221). This basic scheme, commonly referred to as a passive pixel sensor, typically includes an array of pixels connected to an amplifier by horizontal and vertical scanners. Each passive pixel (i.e., having no pixel-based amplification) comprises a silicon photodiode and a pixel access transistor.

Early passive pixel devices fabricated using n-MOS technology were not competitive with emerging CCD-based imagers, except for niche applications such as spectrometry, because the read noise (including blooming and fixed pattern noise) was too high. Furthermore, the circuitry servicing each column did not adequately extract the low-level signal current in the presence of switching noise, vertical smear noise, and random noise. The column buffer, generally comprising a bipolar transistor in emitter follower configuration with a correlated double sampler, typically yielded temporal and fixed pattern noise that was about an order of magnitude higher than that produced by competing CCDs. Nevertheless, companies such as EG&G Reticon continue to produce MOS photodiode arrays having passive pixel designs with various multiplexing schemes.

The advantage of producing imagers using conventional MOS fabrication technologies, rather than esoteric CCD processes requiring many implantation steps and complex interface circuitry, has led to successive improvements. The column buffer was refined by using an enhancement-depletion inverter to provide greater amplification with a small area of wafer "real estate." The amplifier gain effectively reduced the column capacitance, and thus suppressed kTC noise and pattern noise. Low-light level performance was improved by about a factor of three (to a minimum scene illumination of 40 lux) relative to previous MOS imagers.

Subsequently, amplification was relocated to the pixel by means of a phototransistor. Cell-based amplification imagers are sometimes referred to as active pixel sensors. The Base-Stored Image Sensor (BASIS) used a bipolar transistor in emitter follower configuration, with a downstream correlated sampler, to suppress random and temporal noise. By storing the photogenerated signal on the phototransistor's base to provide cell-based charge amplification, the minimum scene illumination was reduced to $10^{-3}$ lux in a linear sensor array. The minimum scene illumination was higher ($\approx 0.01$ lux) in a related two-dimensional BASIS imager having 310,000 pixels because the photoresponse nonuniformity was relatively high ($\leq 2\%$). Although this MOS imager had adequate sensitivity, the pixel pitch was considered too large (at about 13 $\mu$m).

An active pixel sensor comprising a three-transistor pixel is described in U.S. Pat. No. 5,296,696 (Uno). The cell-based source-follower amplifier is augmented with a CMOS column buffer providing fixed pattern noise cancellation. In this scheme, at least one of the three transistors in the pixel is relatively large to minimize amplifier 1/f noise. A large S/N ratio with low pattern noise can be achieved, but the pixel optical fill factor is relatively small.

A compact passive pixel image sensor that can be fabricated using various technologies, including CMOS, NMOS, Bipolar, BiMOS, BiCMOS, or amorphous silicon, is described in U.S. Pat. No. 5,345,266 (Denyer). Denyer buffers the output signal from the passive pixels with charge-integrating column amplifiers to extract the signal from each pixel. However, Denyer does not disclose circuitry to minimize vertical streak noise, minimize random thermal noise, suppress fixed pattern noise, or improve testability.

Because of the complexity and relatively high cost that limit use of CCD-based imaging systems in high volume commercial markets, and the limitations of prior art active and passive pixel sensors, there is a need for new electronic imaging systems that offer significant reductions in cost and power requirements. Because the amplification requirements of a sensor system are quite formidable, considering the small charge originating at each pixel within an array, the amplifier design, whether realized in on-chip or external circuitry, must be rather sophisticated.

SUMMARY OF THE INVENTION

The present invention comprises a low noise readout system for a CMOS imager. The system provides low noise amplification for an array of passive pixels, each of which comprises a photodetector, an access MOSFET to read the signal and multiplex the outputs from the array of pixels, and a second MOSFET that serves as a signal overflow shunt and a means for electrically injecting a test signal. In a typical two-dimensional array, multiplexing may be performed by horizontal and vertical shift registers, for example, as is known in the prior art. The low noise amplifier of the present invention forms a column buffer for reading out each column (or row) of pixels. The low noise column buffer comprises a robust CMOS capacitive transimpedance amplifier (CTIA), gain-setting feedback capacitors, selectable load capacitors, correlated double sampling and sample-and-hold circuits, an optional pipelining circuit, and an offset cancellation circuit connected to an output bus to suppress the input offset nonuniformity of the amplifier.

Each passive pixel interfaced by the read out system has the following features: (1) a high fill-factor photodetector preferably formed by the lightly-doped drain (LDD) n-type implant into the p-type foundation common to most commercial CMOS processes; (2) a signal overflow MOSFET that drains excess charge under large signal conditions to prevent vertical streak noise, provides a means for electrically injecting a signal onto the photodiode capacitance with well-controlled charge equilibration for a low-cost built-in test, and provides optimum management of integration time; and (3) an access MOSFET that enables read out of the electrically or optically induced signal.

The low noise read out system of the present invention includes the following features: (1) sufficient bandwidth and transient response to avoid generation of fixed pattern noise due to variations in amplifier time constants and stray capacitances; (2) on-chip sensitivity control by means of multiple feedback capacitances that may be programmed using an n-bit digital word read in and stored on-chip on a frame-by-frame basis; (3) adequate power supply rejection to enable development of a single-chip camera without elaborate support electronics such as extensive noise decoupling circuitry; (4) suppression of kTC noise associated with the column capacitance; (5) suppression of pattern noise associated with parasitic clock feed-through and nonuniformity in signal settling; (6) selectable band-limiting to minimize the broadband channel noise associated with the wideband charge-integrating CTIA; (7) optional signal pipeline to alleviate amplifier bandwidth requirements and minimize power dissipation; (8) amplifier offset cancellation to suppress pattern noise from threshold nonuniformity; and (9) high tolerance to parametric variations, which allows amplifier partitioning and subsequent application to imaging arrays having pixel pitch of 5 microns or less.

The present invention has the advantage of full process compatibility with standard silicided submicron CMOS. The system exploits the signal processing capability inherent in CMOS and maximizes yield and minimizes die cost by restricting circuit complexity to the column buffers. The use of an overflow MOSFET to manage integration time and provide automatic gain control is preferred to the vertical blooming control used in many CCDs and some MOS imaging arrays because an additional reset MOSFET is not needed, the spectral response is broad from the near-UV to the near-IR (alternatively pulsing the substrate reduces the absorption depth and thus degrades the near-IR photoresponse), and the scheme allows optimizing the design of the column buffer for low total noise. In addition, the offset cancellation circuit improves compatibility with disparate CMOS processes having larger threshold voltage nonuniformity.

Because the low noise CMOS imaging system of the present invention has only two small MOSFETs in each pixel, the device has an "as-drawn" fill factor of greater than 50% at 10 $\mu$m pixel pitch using 0.6 $\mu$m design rules in CMOS. The actual optical fill factor is somewhat larger because of lateral collection and the approximately 100 $\mu$m diffusion length of commercial CMOS processes. The invention has additional advantages, including flexibility to collocate much digital logic and signal-processing (due to the robust amplifier design); read noise below 60 e- and 95 e- for 288-element and 488-element column lengths, respectively, at data rates compatible with high definition television (HDTV); fixed pattern noise significantly below 0.1% (which is comparable to competing CCD imagers); less than 0.5% nonlinearity over 1.2 V signal swing for 3.3 V power supply; large handling capacity; and variable sensitivity using a serial interface updated digitally on a frame-by-frame basis. The design of the invention also permits incorporation of other signal-processing features onto each die while maintaining sensitivity and tolerance to clocking noise. As an example, a high-speed analog-to-digital converter can be added after the output amplifier to interface directly with a microprocessor.

A principal object of the invention is an improved electronic imaging system. A feature of the invention is an integrated low noise amplifier for read out of a passive pixel sensor system. An advantage of the invention is reduced noise, cost, and power consumption in a electronic imaging system implemented in CMOS.

BRIEF DESCRIPTION OF THE DRAWINGS

For a more complete understanding of the present invention and for further advantages thereof, the following Detailed Description of the Preferred Embodiments makes reference to the accompanying Drawings, in which.

DETAILED DESCRIPTION OF THE PREFERRED EMBODIMENTS

Visible imaging systems implemented in CMOS have the potential for significant reductions in cost and power requirements in components such as image sensors, drive electronics, and output signal conditioning electronics. An objective is a video camera that can be configured as a single CMOS integrated circuit supported by only an oscillator and a battery. Such a CMOS imaging system would require lower voltages and would dissipate less power than a CCD-based system, providing improvements that translate into smaller size and longer battery life.

Because of the advantages offered by CMOS visible imagers, there have been ongoing efforts to develop active pixel sensor (APS) devices. Active pixel sensors can provide low read noise comparable to scientific grade CCD systems. The active circuits in each pixel of APS devices, however, utilize cell "real estate" that could otherwise be used to maximize the sensor optical fill factor. Active pixel circuits also tend to increase power dissipation, increase fixed pattern noise (possibly requiring additional circuitry to suppress the noise), and limit the scalability of the technology.

In contrast to APS systems, CMOS sensors with passive pixels offer advantages such as high optical fill factor and pixel density without microlenses, minimal power dissipation, imager scalability, and lower fixed pattern noise. However, passive pixel systems generally exhibit undesirable read noise as well as compatibility problems with standard CMOS processes. The total read noise that must be reduced to make a CMOS imager practical includes temporal noise associated with capacitance of the column bus, vertical streak noise resulting from signal overflow, and fixed pattern noise from various sources such as clock feed-through during pixel access.

The CMOS read out and amplification system of the present invention includes a practical design for a passive pixel array, including a low noise charge integrating amplifier to extract the photodetector signals. Prototype embodiments of the low noise amplifier have included a visible imager comprising an array of 648 (columns) by 488 (rows) of visible light detectors (photodetectors) and another imager comprising 356 (columns) by 288 (rows). In these embodiments, the rows were spaced 10 microns center-to-center, but the even rows were shifted 5 microns to the right of the odd rows. Several columns and rows of detectors (typically up to six) at the perimeter of the light-sensitive region may be covered with metal and used to establish the dark level for on-chip signal processing, including suppression of column-to-column pattern noise. In addition, the detectors in each row may be covered with color filters. For example, the odd rows may begin at the left with red, green, then blue filters, and the even rows may begin with blue, red, then green filters, with these patterns repeating to fill the respective rows.

Figure 1:
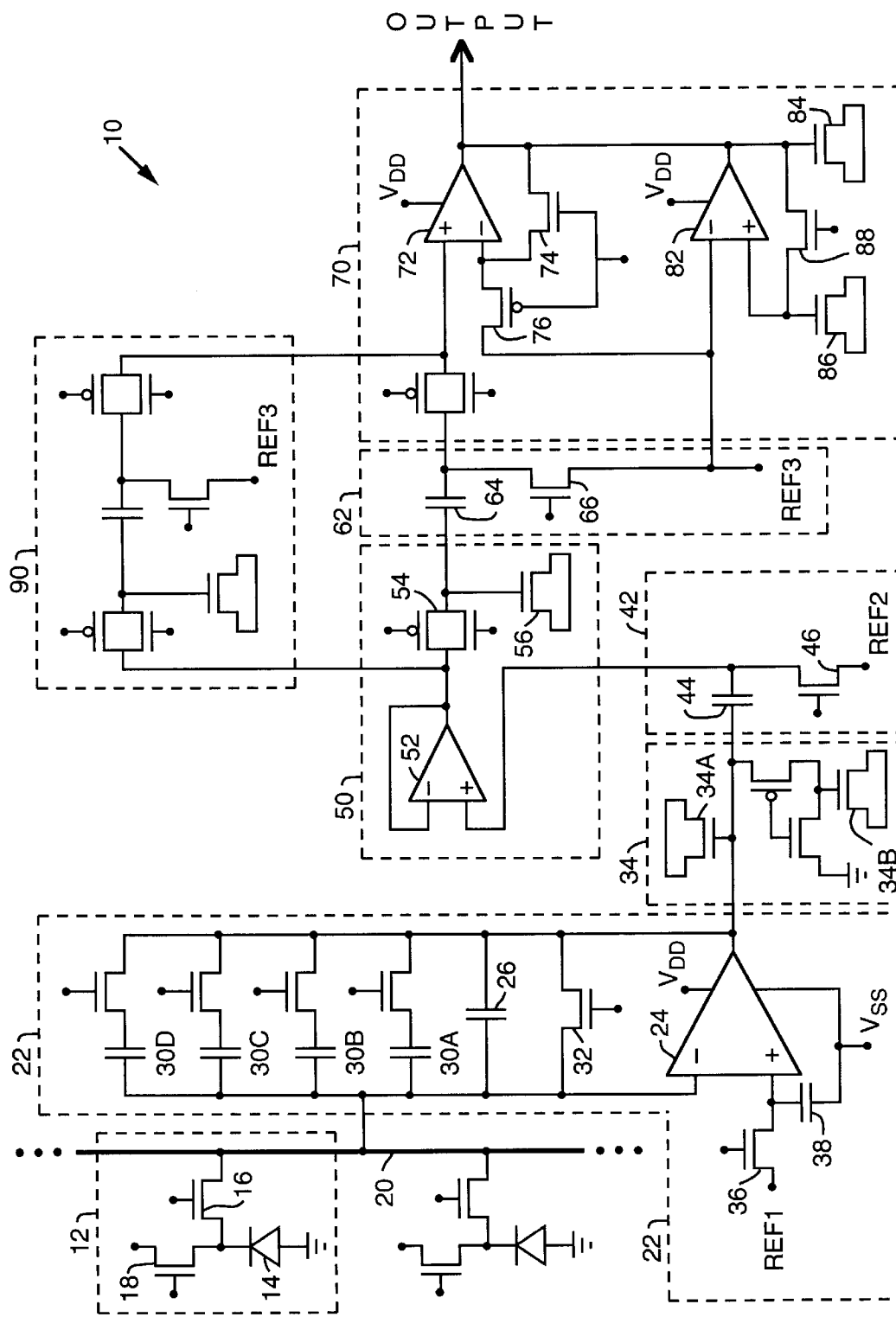
FIG. 1 is a schematic circuit diagram illustrating a low noise CMOS amplification system for readout of a passive pixel imaging array.

A low noise CMOS read out amplifier 10 of the present invention is illustrated in the schematic diagram of FIG. 1. In the preferred embodiment, each pixel 12 of the sensor array comprises a photodetector, such as a photodiode 14, connected to an access MOSFET 16 and a signal overflow MOSFET 18. The signal from photodiode 14 is read through access MOSFET 16 to a column bus 20. Column bus 20 connects all pixels in a column of the photodetector array to the read out amplifier 10. A separate read out amplifier 10 is provided for each column in the photodetector array. Photodiode 14 may comprise a substrate diode, for example, with the silicide cleared. In this embodiment, it is necessary to clear the silicide because it is opaque to visible light. Pixel 12 is designed in the simplest form to obtain the largest available light detecting area while providing broad spectral response, control of blooming and signal integration time, and compatibility with CMOS production processes.

For maximum compatibility with standard submicron CMOS processes, photodiode 14 may be formed by using the lightly doped drain (LDD) implant of MOSFET 16 to create a p-n junction. In this embodiment, each photodiode 14 comprises the lightly doped source of access MOSFET 16. Since no additional ion implantation is necessary, the process and wafer cost for circuit 10 are the same as those of standard, high volume digital electronic products. Because the LDD implant is deeper than a standard source/drain implant, the spectral response of photodiode 14 is high for near-IR radiation.

In the prototype embodiment, the signals from photodetectors 12 were read out one row at a time, from bottom to top of the array. Within each row, photodetectors 12 were read out from left to right. Readout is initiated by turning on the access MOSFETs 16 of all the photodetectors 12 in a selected row. This connects each photodetector 12 in the selected row to its corresponding column bus 20. Each column bus 20 is connected to a charge integrating amplifier circuit, which comprises a capacitive transimpedance amplifier (CTIA) 22. Thus, the photocharge from each row-selected photodiode 14 is transferred to its corresponding CTIA 22 by its column bus 20.

Capacitive transimpedance amplifier (CTIA) 22 includes a high gain, wide bandwidth, CMOS differential amplifier 24 with a small feedback capacitor 26 connected in parallel to form a charge amplifier. The sensitivity of CTIA 22 can be adjusted by selecting one or more gain-setting, parallel feedback capacitors 30A–30D, in any combination, with the minimum feedback capacitance 26. A reset switch 32 connected across the parallel feedback capacitors allows the signal (i.e., the photo-generated charge) to be cleared from CTIA 22 after it has been read. An optimum load capacitance 34 (which may include a semiconductor capacitance 34A and a switchable semiconductor capacitance 34B) is connected to the output of CTIA 22 and can be selected as required to limit the bandwidth and thus control noise, particularly the broadband channel noise of CTIA 22.

After a signal from photodetector 12 has been transferred to CTIA 22, photodetector voltage is set by REF1 to about 2 volts for a 5 V power supply (or to about 1.4 volts for a 3.3 V power supply). The voltage on the photodetector capacitance 26 (and 30A–30D) will subsequently discharge toward zero at a rate proportional to the incident light intensity. The photodetector signal is prevented from reaching zero by the turn-on of overflow MOSFET 18 as the gate-to-source voltage reaches the threshold voltage of MOSFET 18. Otherwise isolation would fail, resulting in crosstalk and vertical streak noise. The gate of overflow MOSFET 18 is set at about 1.2 V by an internally generated bias. When the photodetector signal reaches about 0.4 V, the excess signal begins shunting through overflow MOSFET 18 to the supply bus. As a result, the maximum photodetector signal is limited to about 0.1 picocoulomb.

The positive (+) (noninverting) terminal of differential amplifier 24 is connected to a low noise reference (REF1). REF1 is typically generated on-chip by a bandgap reference circuit (for lowest possible temporal noise) and sampled by a sample-and-hold (S/H) circuit consisting of a MOSFET switch 36 and a capacitor 38. By sampling reference voltage REF1, wideband noise of the reference is band-limited to the Nyquist bandwidth established by the S/H clock frequency. In an alternative embodiment, the noninverting (+) terminal of each differential amplifier 24 (i.e., one amplifier for each column in a two-dimensional imaging array, as explained above) is connected to a "black" reference pixel (constituting REF1 in this embodiment) to suppress column-to-column offsets and other common mode noise. Each "black" reference pixel comprises a standard pixel that is converted with light-absorbing material so that its output is generated primarily by dark signal mechanisms. This configuration provides low spatial noise by removing the noise associated with column-to-column offsets at the front end of CTIA 22.

In a preferred embodiment of system 10, two correlated double sampling circuits are used to improve circuit sensitivity. A first correlated double sampling circuit 42 includes a series capacitor 44 connected between the output of CTIA 22 and a clamp switch 46. Immediately after a passive pixel (such as pixel 12) has been read and reset, clamp switch 46 is connected to a reference (REF2) and CTIA 22 is held at reset (with reset switch 32 closed). Capacitor clamp switch 46 is released (opened) only after reset switch 32 is opened and CTIA 22 is allowed to settle. Thus, when CTIA 22 is at its final reset level, the far side of capacitor 44 will be at the reference level REF2. Temporal reset noise associated with column bus capacitance and amplifier 24 is suppressed at this point.

The far terminal of capacitor 44 is connected to a buffer stage 50 comprising a unity gain buffer amplifier 52, a CMOS sample-and-hold (S/H) switch 54, and a S/H capacitor 56. A second correlated double sampling circuit 62 includes a series capacitor 64 connected between S/H buffer 50 (the sampled-and-held output of CTIA 22) and a clamp switch 66 to suppress column-to-column fixed pattern noise. At the start of each frame, when the settled reset signals from the "black" pixels are read out through the signal processing chain comprising CTIA 22, clamp circuit 42, and S/H buffer 50, clamp switch 66 connects series capacitor 64 to a reference (REF3). Capacitor clamp switch 66 is released (opened) only after reset switch 32 has been opened, CTIA 22 has been allowed to settle, and clamping switch 46 has been opened. Thus, when CTIA 22 is at its settled reset level, the far side of capacitor 64 will be at reference level REF3. Column-to-column pattern noise is suppressed at this point.

The far terminal of capacitor 64 is connected to an offset cancellation circuit 70, which includes a main amplifier 72 comprising a single stage transconductor with a high output impedance connected to an output bus. A unity gain buffer is obtained by connecting the output of amplifier 72 to its inverting (−) input through feedback connection offset switch 74, unhooking REF3 by means of reference switch 76, and connecting the photocharge signal from clamp circuit 62 to the noninverting (+) input. Threshold adjustment is obtained by placing a low transconductance amplifier 82 in parallel with main amplifier 72. To cancel the offset, amplifier 72 is put in a high gain mode by opening a feedback connection switch 74. The inverting (−) input to amplifier 82 is tied to reference voltage REF3, and the output is connected to filter capacitor 84 and sample capacitor 86 through offset switch 88. Amplifier 82 thus generates a current to cancel the unbalance current of main amplifier 72. The correction voltage is trapped on capacitor 86, and main amplifier 72 is restored to its unity gain configuration. This technique of offset cancellation of the output bus driver is further described in Degrauwe et al., "A Micropower CMOS-Instrumentation Amplifier," *IEEE Journal of Solid-State Circuits*, Vol. SC-20, No. 3, pp. 805–807 (June 1985).

As an option, the output of buffer amplifier 52 may be connected, by the addition of at least one parallel circuit 90, to an analog pipeline that includes at least two parallel branches. Circuit 90 is simply a duplicate of the sample-and-hold (S/H) and correlated double sampling circuits that it parallels. With appropriate switching, pipelined sample-and-hold circuitry allows a photodetector signal from the currently selected row of the photodetector array to be transferred to CTIA 22 while data from the previously selected row is being multiplexed onto the output bus. Final multiplexing may be used to distribute the red, green, and blue signals.

Figure 2:
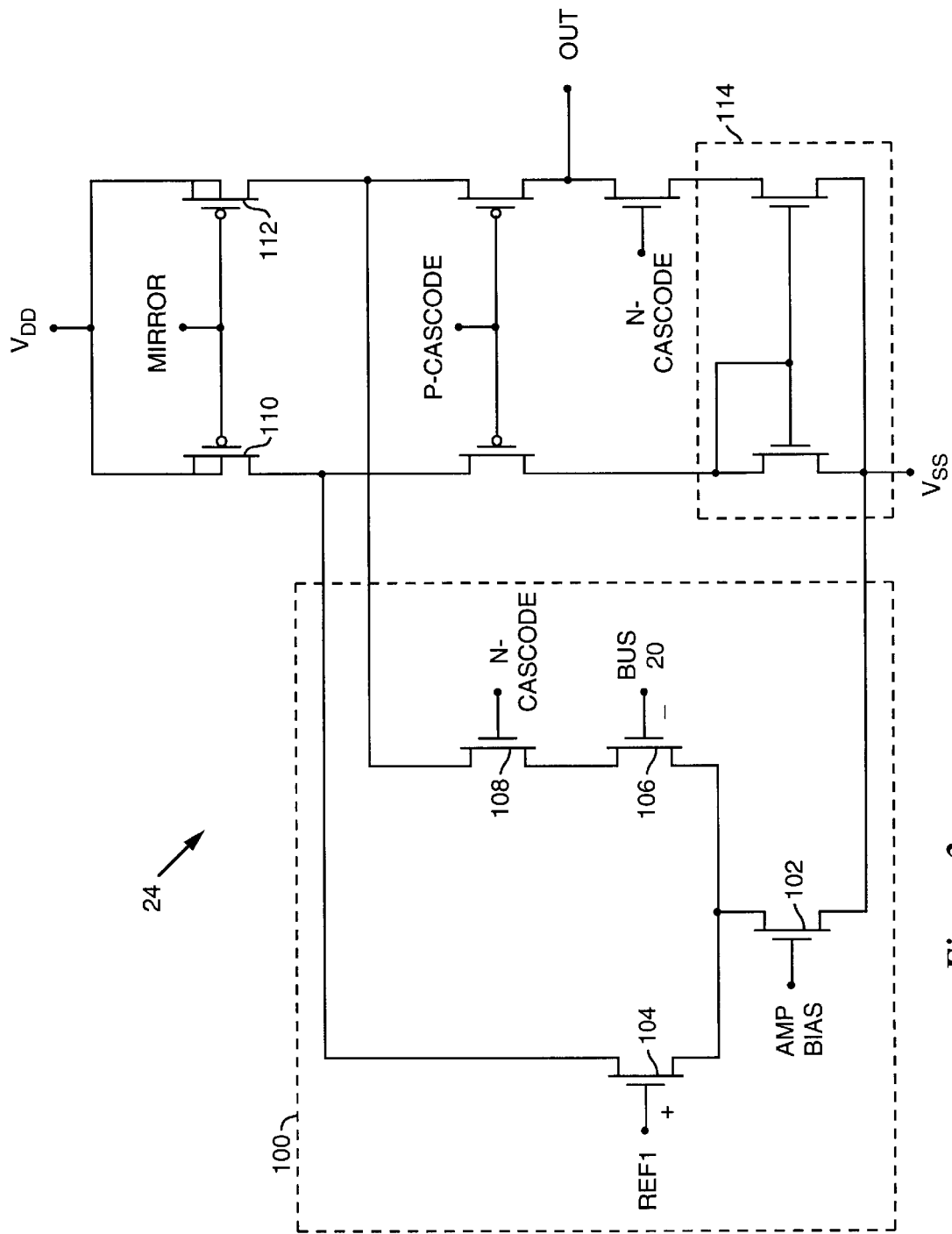
FIG. 2 is a schematic circuit diagram illustrating a preferred embodiment of a high gain, wide bandwidth, differential amplifier incorporated in the system of FIG. 1.

As further illustrated in FIG. 2, a preferred embodiment of differential amplifier 24 comprises a folded cascode architecture that maximizes the closed-loop drive capability, adequately settles the signal independent of parametric variations, minimizes Miller capacitance of the charge-integrating stage, minimizes amplifier noise, and provides robust signal-handling capability in a mixed-signal environment. Core amplifier stage 100 comprises differencing n-type amplifier FETs 104 and 106 in combination with current source n-FET 102. Current source FET 102 is internally set by AMP BIAS to sink 20 $\mu$A, for example, for operation at video frame rates. Amplifier stage 100, with cascoded negative leg comprising n-FET 108, drives a folded cascode current mirror active load 114. A pair of p-FETs 110 and 112 comprise balanced current sources that supply a quiescent bias current of 12 $\mu$A at video frame rates, and by setting MIRROR at the appropriate bias level, amplifier load 114 sinks approximately 2 $\mu$A for each leg. The reduced current in active load 114 enhances open-loop gain as compared to other differential amplifier schemes, which require additional chip "real estate" to achieve similar performance gains. This type of differential amplifier 24 is necessary in a low noise system in order to suppress both 1/f and broadband noise while simultaneously increasing gain.

The design of amplifier 24 illustrated in FIG. 2 avoids generation of fixed pattern noise from subtle signal fluctuations. Amplifier 24 also provides adequate power supply rejection and immunity to possible clocking noise from collocated signal-processing circuitry, and its robust properties enable column-to-column partitioning of low noise CTIAs 22 as pixel pitch is reduced below 20 $\mu$m. In preferred embodiments of system 10 having 10 $\mu$m pixel pitch in the horizontal direction, alternating columns of pixels may be serviced by low noise CTIAs 22 having column buffers (laid out in 20 $\mu$m pitch) that are alternately located along the top and bottom of the imaging area. With this scheme, the signals read from alternating columns are split between the top and bottom banks of CTIAs 22.

In the present invention, all clock signals for circuit 10, including pixel access and reset, charge integrating amplifier readout and reset, correlated double sampling, and column offset cancellation, are generated on-chip using standard CMOS digital logic. This digital logic scheme enables "windowing," wherein a user can read out the imager in various formats simply by selecting the appropriate support logic. With windowing, the 648×488 format of the prototype embodiment can be read out as one or more arbitrarily sized and positioned M×N arrays without having to read out the entire array. For example, a user might desire to change a computer compatible "VGA" format (i.e., approximately 640×480) to either Common Interface Format (CIF; nominally 352×240) or Quarter Common Interface Format (QCIF; nominally 176×120) without having to read out all the pixels in the entire array. This feature simplifies support electronics to reduce cost and match the needs of the particular communication medium. As an example, a personal teleconference link to a remote user having only QCIF capability could be optimized to provide QCIF resolution and thus reduce bandwidth requirements throughout the teleconference link. As a further example, an imager configured in Common Interface Format (CIF) could provide full-CIF images while supplying windowed information for the portions of the image having the highest interest for signal processing and data compression. During teleconferencing the window around a person's mouth (for example) could be supplied more frequently than the entire CIF image. This scheme would reduce bandwidth requirements throughout the conference link.

As mentioned above, an important feature of the present invention is the ability to test the device by using electrically generated signals (as opposed to optically-generated signals). Overflow MOSFET 18 can be configured (alternatively) to supply minority carriers rather than to dump excess photo-generated charge. A built-in test mode can be enabled by applying a positive pulse to the "drain" of overflow MOSFET 18, which now acts as a source, and modulating the gate voltage to meter a precise packet of charge onto the photodiode capacitance by charge equilibration. This technique is further described in M. F. Tompsett, "Surface Potential Equilibration Method of Setting Charge in Charge-Coupled Devices," *IEEE Trans. on Electron Devices*, Vol. ED-22, No. 6, pp. 305–309 (June 1975). By further modulating the metering gate on a row-by-row basis and the REF1 voltage on a column-by-column basis, a checkerboard pattern can be programmed into a two-dimensional embodiment of the invention. This feature enables testing of the imaging sensor system 10 without an optical stimulus.

The large degree of flexibility of the invention with respect to sensitivity, band-limiting, and built-in testing can be accommodated by latching in a serial word, which subsequently sets the various switches in the desired positions. In a preferred embodiment, the word is clocked in by the pixel clock and latched by a second clock at the frame rate. CMOS clock drivers buffer the latched data and drive the appropriate CMOS voltage divider circuits, thereby setting the switches in the appropriate states. The selectability is, therefore, programmable on a frame-by-frame basis.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

We claim:

1. A CMOS passive pixel sensor system, comprising:
   a pixel comprising a photodetector connected to an access transistor;
   a capacitive transimpedance amplifier (CTIA) having a CTIA input and a CTIA output; an electrical bus connecting said pixel to said CTIA input;
   a reset switch and a selectable feedback capacitance connected in parallel from said CTIA input to said CTIA output;
   a selectable load capacitance connected to said CTIA output;
   a first correlated double sampling circuit connected to said load capacitance;
   a sample-and-hold buffer circuit connected to said first correlated double sampling circuit; and
   an offset cancellation circuit connecting said buffer circuit to an output bus.

2. The CMOS passive pixel sensor system of claim 1, wherein said pixel further comprises an overflow transistor connected to said photodetector and having a gate continually biased for preventing saturation.

3. The CMOS passive pixel sensor system of claim 2, wherein said photodetector comprises a photodiode formed from a lightly doped source region of said access transistor.

4. The CMOS passive pixel sensor system of claim 1, wherein said capacitive transimpedance amplifier (CTIA) includes a high gain, wide bandwidth, CMOS differential amplifier.

5. The CMOS passive pixel sensor system of claim 4, wherein said CMOS differential amplifier has a first input connected to said CTIA input and a second input connected to a low noise reference.

6. The CMOS passive pixel sensor system of claim 5, wherein said second input of said CMOS differential amplifier is connected to a black pixel that generates said low noise reference for subtracting fixed pattern noise.

7. The CMOS passive pixel sensor system of claim 1, further comprising a pipeline circuit having at least first and second parallel paths connected between said buffer circuit and said offset cancellation circuit.

8. The CMOS passive pixel sensor system of claim 1, further comprising a second correlated double sampling circuit connected between said buffer circuit and said offset cancellation circuit.

9. The CMOS passive pixel sensor system of claim 8, wherein said offset cancellation circuit includes an output amplifier having an input connected to said second correlated double sampling circuit and an output connected to said output bus.

10. The CMOS passive pixel sensor system of claim 9, wherein said offset cancellation circuit further includes a low transconductance amplifier having an input connected to a low spatial noise reference signal and an output connected to said output bus.

11. A readout circuit for a CMOS passive pixel sensor system, comprising:

a plurality of pixels connected to an input bus, each of said pixels comprising a photodetector, an overflow transistor connected to said photodetector, and an access transistor connecting said photodetector to said input bus;
a high gain, wide bandwidth, CMOS differential amplifier having a first input connected to said input bus, a second input connected to a low noise reference, and an amplifier output;
a reset switch and a feedback capacitance connected in parallel from said input bus to said amplifier output;
a selectable load capacitance connected to said amplifier output;
a first correlated double sampling circuit connected to said load capacitance;
a sample-and-hold buffer circuit connected to said first correlated double sampling circuit;
an offset cancellation circuit connected to an output bus; and
a pipeline circuit having at least two parallel branches connecting said buffer circuit to said offset cancellation circuit.

12. The readout circuit of claim 11, wherein said feedback capacitance comprises a plurality of selectable feedback capacitors connected in parallel from said input bus to said amplifier output.

13. The readout circuit of claim 11, wherein each of said parallel branches of said pipeline circuit includes a second correlated double sampling circuit.

14. The readout circuit of claim 11, wherein said offset cancellation circuit comprises:
   an output amplifier having an input connected to said pipeline circuit and an output connected to said output bus; and
   a low transconductance amplifier having an input connected to a low spatial noise reference signal and an output connected to said output bus.

15. The readout circuit of claim 11, wherein said second input of said CMOS differential amplifier is connected to a black pixel that generates said low noise reference for subtracting fixed pattern noise.

16. A CMOS column readout circuit for an array of passive pixels, comprising:
   a column bus connecting a column of said pixels to the readout circuit;
   each of said column pixels comprising an access transistor connected to said column bus, a lightly doped source region of said access transistor forming a photodiode, and an overflow transistor connected to said photodiode;
   a capacitive transimpedance amplifier (CTIA) comprising a high gain, wide bandwidth, CMOS differential amplifier having a first input connected to said column bus, a second input connected to a low noise reference, and an amplifier output;
   said CTIA including a reset switch and a selectable feedback capacitance connected in parallel between said first amplifier input and said amplifier output;
   a selectable load capacitance connected to said amplifier output;
   a first correlated double sampling circuit connected to said load capacitance;
   a sample-and-hold buffer circuit connected to said first correlated double sampling circuit;

an offset cancellation circuit connected to an output bus; and a pipeline circuit having at least two parallel branches connecting said buffer circuit to said offset cancellation circuit, each of said parallel branches of said pipeline circuit includes a second correlated double sampling circuit.

17. The CMOS column readout circuit of claim 16, wherein said second input of said CMOS differential amplifier is connected to a black pixel that generates said low noise reference for subtracting fixed pattern noise.

18. The CMOS column readout circuit of claim 16, wherein said offset cancellation circuit includes an output amplifier having an input connected to said pipeline circuit and an output connected to said output bus.

19. The CMOS column readout circuit of claim 18, wherein said offset cancellation circuit further includes a low transconductance amplifier having an input connected to a low spatial noise reference and an output connected to said output bus.

20. The CMOS column readout circuit of claim 16, further comprising digital logic for reading out selected ones of said pixels connected to said column bus.

* * * * *